(12) United States Patent
Rogren

(10) Patent No.: US 10,581,111 B2
(45) Date of Patent: Mar. 3, 2020

(54) CERAMIC LITHIUM RETENTION DEVICE

(71) Applicant: KERACEL, INC., Santa Clara, CA (US)

(72) Inventor: Philip E. Rogren, Half Moon Bay, CA (US)

(73) Assignee: KERACEL, INC., Santa Clara, CA (US)

( * ) Notice: Subject to any disclaimer, the term of this patent is extended or adjusted under 35 U.S.C. 154(b) by 62 days.

(21) Appl. No.: 15/883,698

(22) Filed: Jan. 30, 2018

(65) Prior Publication Data

US 2018/0219251 A1    Aug. 2, 2018

Related U.S. Application Data

(60) Provisional application No. 62/452,873, filed on Jan. 31, 2017.

(51) Int. Cl.
*H01M 10/0525* (2010.01)
*H01M 10/04* (2006.01)
(Continued)

(52) U.S. Cl.
CPC ....... *H01M 10/0525* (2013.01); *H01M 4/664* (2013.01); *H01M 10/0459* (2013.01); *H01M 10/052* (2013.01); *H01M 10/058* (2013.01); *H01M 10/0562* (2013.01); *H01M 4/134* (2013.01); *H01M 4/661* (2013.01);
(Continued)

(58) Field of Classification Search
CPC ......... H01M 10/0525; H01M 10/0459; H01M 10/0562; H01M 4/134; H01M 4/664
See application file for complete search history.

(56) References Cited

U.S. PATENT DOCUMENTS 3,201,278 A    8/1965   Kurtzweil et al.
5,776,632 A    7/1998   Honegger
              (Continued)

FOREIGN PATENT DOCUMENTS

WO    1998/037588 A1    8/1998
WO    2016197006        12/2016
WO    2019/152531 A1    8/2019

OTHER PUBLICATIONS

Bates et al., Lithium-Free Thin-Film Battery in In Situ Plated Li Anode, J. Electrochem Soc., 1999, vol. 147(2), pp. 517-552.
(Continued)

*Primary Examiner* — Osei K Amponsah
(74) *Attorney, Agent, or Firm* — Jennifer Hayes; Nixon Peabody LLP

(57) ABSTRACT

A ceramic lithium battery sub-cell is provided. The ceramic lithium battery sub-cell includes a cathode region, an anode region, and a separator interconnecting the cathode region and the anode region. The separator is a ceramic electrolyte free of penetrating apertures. The ceramic lithium battery sub-cell also includes a cathode current collector positioned on a surface of the cathode region, and an anode current collector positioned on a surface of the anode region. The anode region is filled with a first porous electrolyte encapsulated by the separator, the anode current collector and at its periphery by a second porous electrolyte. The porosity of the second porous electrolyte is less than the porosity of the first porous electrolyte.

17 Claims, 4 Drawing Sheets

(51) Int. Cl.
  *H01M 10/0562* (2010.01)
  *H01M 4/134* (2010.01)
  *H01M 4/66* (2006.01)
  *H01M 10/052* (2010.01)
  *H01M 10/058* (2010.01)
  *H01M 10/42* (2006.01)

(52) U.S. Cl.
  CPC .............. *H01M 2010/4292* (2013.01); *H01M 2300/0071* (2013.01); *H01M 2300/0094* (2013.01)

(56) References Cited

U.S. PATENT DOCUMENTS

| | | |
|---|---|---|
| 6,168,884 B1 | 1/2001 | Neudecker et al. |
| 6,713,987 B2 | 3/2004 | Krasnov et al. |
| 6,805,999 B2 | 10/2004 | Lee et al. |
| 7,829,225 B2 | 11/2010 | Salot et al. |
| 8,304,115 B1 | 11/2012 | Petkov et al. |
| 2007/0037058 A1 | 2/2007 | Visco et al. |
| 2007/0117007 A1 | 5/2007 | Visco et al. |
| 2008/0153000 A1 | 6/2008 | Salot et al. |
| 2010/0330401 A1 | 12/2010 | Oukassi et al. |
| 2013/0244085 A1* | 9/2013 | Coors .................. H01M 4/136 429/160 |
| 2015/0099188 A1 | 4/2015 | Holme et al. |
| 2019/0237808 A1 | 8/2019 | Rogren |

OTHER PUBLICATIONS

International Search Report and Written Opinion for PCT/US2019/015868 dated Jun. 3, 2019.

\* cited by examiner

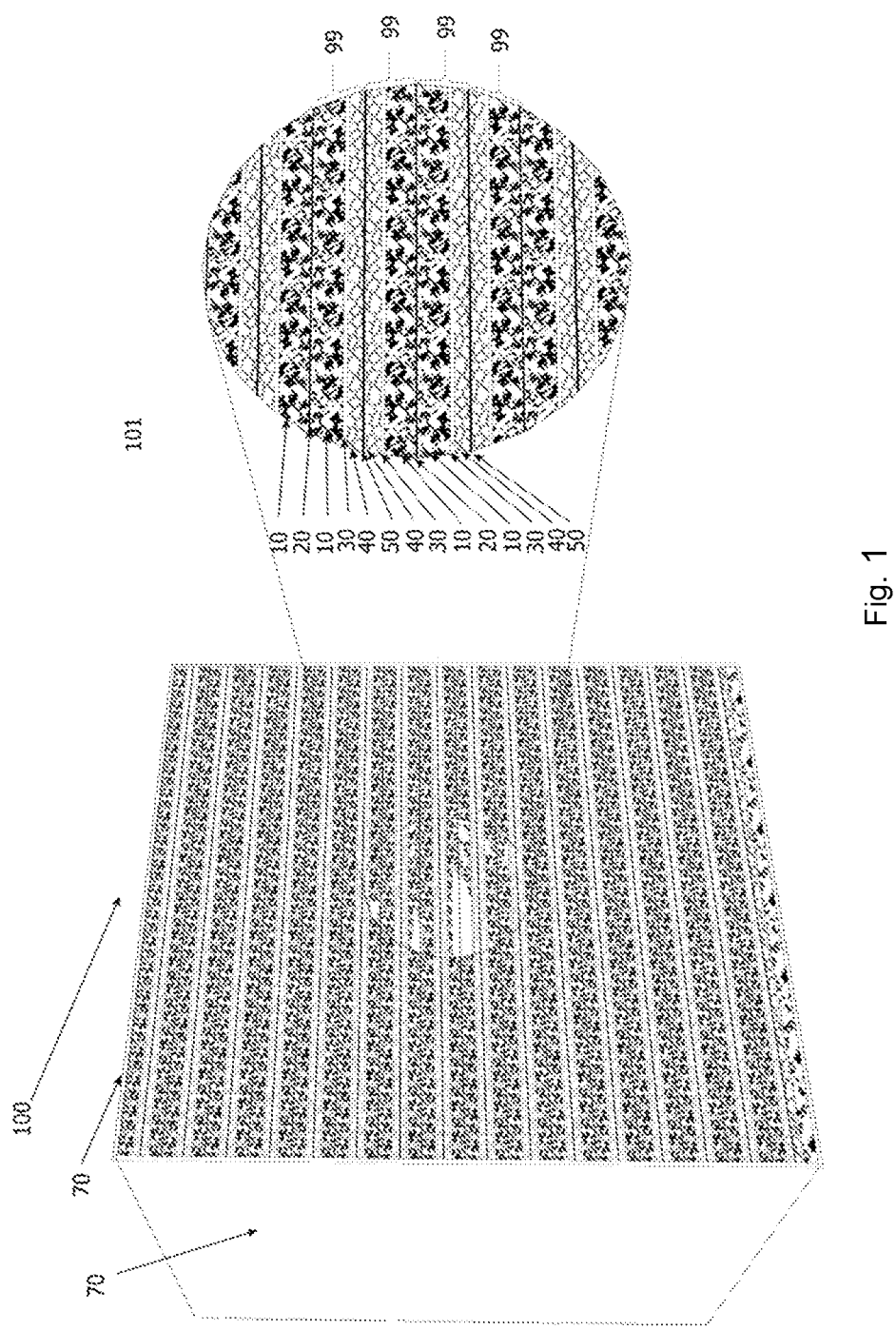

CERAMIC LITHIUM RETENTION DEVICE

CROSS REFERENCE TO RELATED APPLICATIONS

This application claims priority to U.S. Provisional Application No. 62/452,873 entitled "SOLID-STATE CELL STRUCTURE", filed on Jan. 31, 2017, the contents of which are incorporated by reference in its entirety.

FIELD

Embodiments of the invention relate to solid state batteries, and in particular to ceramic solid state batteries, including structures and manufacturing methods thereof.

BACKGROUND

Batteries with lithium metal anodes represent the highest energy density of any commercially available batteries. While the redox reactions that liberate the energy from the lithium metal chemistry are reversible, rechargeable batteries with lithium metal anodes are not commercially available. Such rechargeable batteries are not commercially available because of the potential of fire and explosion caused by the growth of lithium dendrites during the recharge cycle. The recharge cycle can create a short circuit directly between the anode and cathode. Several strategies for preventing shorting dendrites have been advanced with varying degrees of success, but none have yet reached the level of safety required for commercial acceptance. Indeed, eliminating the potential for dendritic growth remains a major consideration in the design of lithium ion batteries, which are much less susceptible to the phenomenon. Among the most promising approaches for reducing the fire and explosion risk in advanced LIBs (Lithium Ion Batteries) with lithium metal anodes is the use of solid-state, ceramic electrolyte as the separator between anode and cathode. Use of ceramic separators not only virtually eliminates the risk of dendrite growth but also removes all flammable material from the cell. Thus, even if a short circuit does occur, there is nothing in the cell to burn or explode. An additional advantage of ceramic electrolyte is its inherent stability at voltages well beyond the stability limits for conventional liquid electrolyte. Conventional electrolyte breaks down when the voltage difference between anode and cathode is much above 4 volts. Ceramic electrolyte display electrochemical stabilities well beyond six volts. Increasing the cell voltage from 4 volts to 6 volts increases the energy of the cell by 50%. Ceramic electrolyte also confers significant advantages in the volume of materials used for cell packaging. For example, the ceramic electrolyte does not outgas like a liquid electrolyte.

The concept of lithium based batteries with ceramic electrolytes has been around for many years, and many cells employing thin film fabrication techniques have been manufactured. However, these cells suffer from very low specific energy and very high cost. One of the major problems with previous efforts at practical cells with ceramic electrolytes stems from the properties of the ceramics themselves. All the ceramic materials recognized as practical candidates for application as solid-state electrolytes are very hard and brittle, and they must be very thin to act as practical separators in a lithium ion cell. The requirement for thinness comes both from the need to limit the volume of materials, such as electrolyte, that do not directly contribute to the storage of energy. Furthermore, electrolyte volume can be limited because the best of ceramic electrolytes are still not great conductors of lithium ions and must be as thin as possible to limit the internal resistance of the cell. Typically, experts in the field of solid-state batteries consider that the best ceramic electrolyte separators should be no more than 40 μm thick. Producing such thin flat sheets of brittle ceramic by conventional means is difficult and expensive. Moreover, the end product is very difficult to incorporate into a volume manufacturing scheme. Thin flat sheets of brittle ceramic are also very susceptible to fracture when the layers of the cell are pressed together to assure adequate contact among the various layers of the cell.

SUMMARY

A ceramic lithium battery sub-cell is disclosed. The ceramic lithium battery sub-cell includes a cathode region, an anode region, and a separator interconnecting the cathode region and the anode region. The separator is ceramic electrolyte free of penetrating apertures that would allow cathode materials to come into contact with anode materials. The ceramic lithium battery sub-cell also includes a cathode current collector positioned on a surface of the cathode region, and an anode current collector positioned on a surface of the anode region. The anode region is filled with a first porous electrolyte encapsulated by the separator, the anode current collector and at its periphery by a second porous electrolyte. The porosity of the second porous electrolyte is less than the porosity of the first porous electrolyte.

In some embodiments, the first porous electrolyte comprises a porous ceramic electrolyte includes an open volume between 20% and 100%. In some embodiments, the anode region includes pores filled with metallic lithium by electrolytic transport of lithium ions from lithium bearing cathode material within the cathode region. In some embodiments, the anode region includes pores partially filled with metallic lithium by electrolytic transport of lithium ions from lithium bearing cathode material within the cathode region. The transport of lithium from the cathode region to the anode region charges the battery sub-cell. In some embodiments of the ceramic battery sub-cell, a periphery of the anode region is sealed by a region of the same solid electrolyte material used in the separator.

In some embodiments, the second porous electrolyte includes a porous ceramic electrolyte including an open volume between 0 and 20%. In some embodiments, the separator includes a thickness of 0.01 μm to 1000 μm. The thickness of the separator must be sufficient that the porosity of the ceramic electrolyte material cannot lead to apertures penetrating from one surface of the separator to the other.

A battery is disclosed below, where the battery structure is manufactured using ceramic manufacturing techniques. The battery includes a plurality of ceramic sub-cells. Each of the ceramic sub cells includes a cathode region, an anode region, a separator interconnecting the cathode region and the anode region by its ionic conductivity. The separator can be a ceramic electrolyte free of penetrating apertures. Each of the ceramic sub cells can include a cathode current collector positioned on a surface of the cathode region, and an anode current collector positioned on a surface of the anode region. The anode region can be filled with a first porous electrolyte encapsulated by the separator, the anode current collector and at its periphery by a second porous electrolyte. The porosity of the second porous electrolyte is less than the porosity of the first porous electrolyte.

In some embodiments of the disclosed battery, each of the plurality of ceramic sub cells are stacked such that anode regions of adjacent cells share an anode current collector. In some embodiments of the disclosed battery, each of the plurality of ceramic sub cells are stacked in such a way that cathode regions of adjacent cells share a cathode current collector. In some embodiments of the disclosed battery, one or more of the plurality of ceramic sub cells are manufactured using one or more steps of 3D printing. In the process of 3D printing a ceramic material or ceramic material precursor is selectively deposited with finite thickness in a pattern defining the battery sub-cell shape. In some embodiments of the disclosed battery, one or more of the plurality of ceramic sub cells are manufactured using one or more layers of patterned green tape bearing ceramic precursors. In some embodiments of the disclosed battery, one or more of the plurality of ceramic sub cells are manufactured using one or more heat treatments to effect the final ceramic properties, including porosity, mechanical strength, ionic conductivity, and electronic conductivity. In some embodiments of the disclosed battery, the first porous electrolyte has a porous ceramic electrolyte includes an open volume between 20% and 100%. In some embodiments of the disclosed battery, the second porous electrolyte has a porous ceramic electrolyte including an open volume between 0 and 20%. In some embodiments of the disclosed battery, the separator includes a thickness of 0.01 μm to 1000 μm.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only exemplary aspects of the disclosure, and are therefore not to be considered as limiting of its scope The principles are described and explained with additional specificity and detail through the use of the following drawings.

FIG. 1 is a cross section view of a battery employing cells as described herein, stacked to create a high capacity battery.

DETAILED DESCRIPTION

Figure 2A:
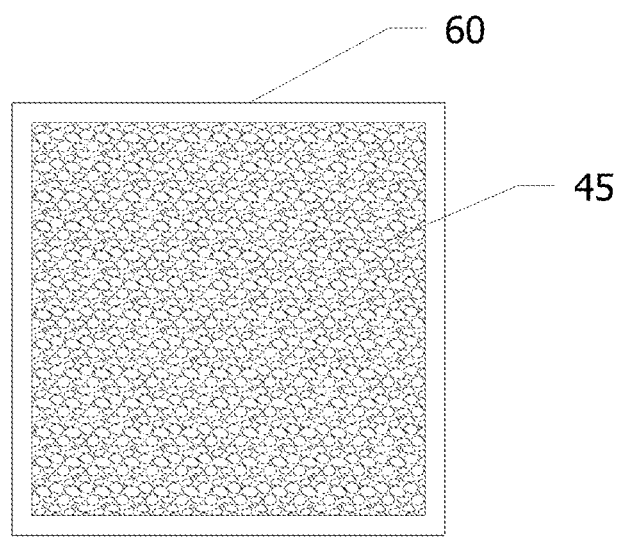
FIG. 2A is a plan view of layer of controlled porosity with a region of high porosity ceramic electrolyte surrounded and sealed by low porosity ceramic electrolyte.

An exemplary advanced solid-state cell is illustrated in FIG. 1. As shown in FIG. 1, the exemplary advanced solid-state cell includes stacked sub-cells 99. Each sub-cell 99 can include alternating thin layers of anode 40 and cathode 10 materials, separated by a separator 30. In some embodiments of the disclosure, the separator 30 can include a solid state electrolyte. For example, the separator 30 can be a thin layer of ceramic electrolyte material. The thin layer of ceramic electrolyte material may be 0.01 μm to 1000 μm thick. Thin layers are advantageous because they allow the cells to have low parasitic series resistance, but thicker layers have a lower probability of having apertures that would allow the cell to experience electrical breakdown. It should be understood the materials introduced herein are examples. Moreover, the thickness of the ceramic electrolyte material is provided herein as an example thickness range. The present disclosure can include a thickness measurement that fall outside the exemplary range. The layer 70 surrounding the composite of sub-cells 99 is a ceramic sheath, providing mechanical support and physical protection for the layers within.

In some embodiments of the disclosure, each layer of anode materials 40 and cathode materials 10 can mechanically define the anodes and cathodes for two sub-cells 99 of a many layered cell 100. Each of the sub-cells 99 can be separated by a current collector 50. That is, the boundary between the first and second of these sub-cells 99 can be defined by current collector 50. In some embodiments, the current collector 50 can include low reactivity metals or metallic compounds, like gold, platinum, tin oxide or indium oxide. Other materials can be implemented as a current collector 50 herein.

Alternatively, each sub-cell 99 of the cell 100 can be completely separated from adjacent sub-cells by layers of insulating material. In some embodiments, the insulating material can include dielectric material, ceramic materials such as porcelain. Other ceramics can include alumina and zirconia. Other known materials can be implemented as an insulating material herein. Specifically, each sub-cell is a layered structure, made up of two different classes of solid-state electrolyte materials. A layer of low porosity, impenetrable ceramic electrolyte material can function as each cell's separator 30. The porosity of the impenetrable ceramic electrolyte material can vary between zero to an extreme of 20%, preferably 10% or less. For example, a separator 30 comprising a layer of nonporous ceramic electrolyte might successfully be as thin as 10 μm, but a separator comprising a ceramic electrolyte of 5% porosity might have to be 30 μm thick to avoid penetrating apertures, giving a sub-cell 99 three times more internal series resistance and correspondingly poorer electrical performance. Layers of relatively high but controlled porosity can function specifically as the anode layers 40 and the cathode layers 10. For example, some low porosity ceramic electrolyte material can include lithium aluminum titanium phosphate, lithium aluminum germanium phosphate, lithium lanthanum zirconate garnet (LLZO), LLZO garnet with calcium and niobium substitutions (LLCZN). An anode region 40 or cathode region 10 with 70% porosity would be able to hold twice as much lithium-bearing material as a region having 35% porosity, meaning that for the same total volume, the 70% version would have twice the storage capacity.

Figure 2B:
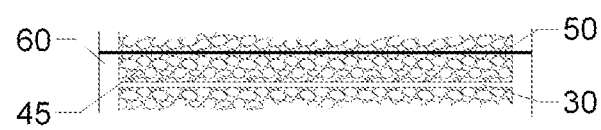
FIG. 2B is a cross section view of layer in FIG. 2A with the region of high porosity ceramic electrolyte sealed top and bottom by current collector and separator.
Figure 3:
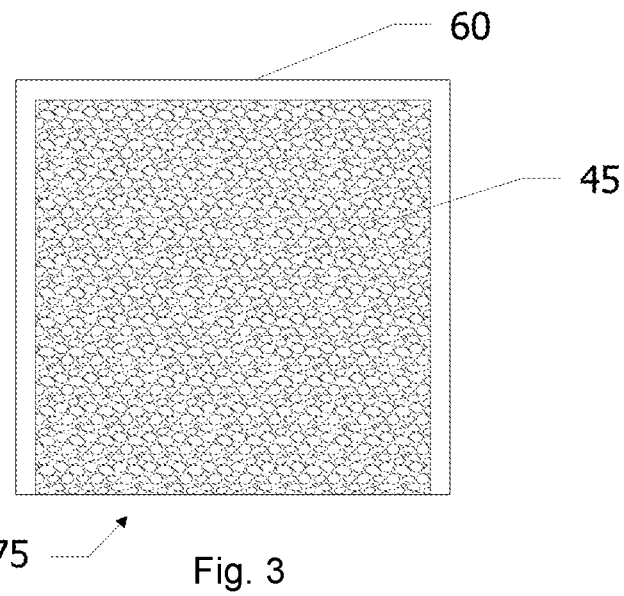
FIG. 3 is a plan view of layer of controlled porosity with a region of high porosity ceramic electrolyte partially surrounded by sealing low porosity ceramic electrolyte, with one side open for filling with a cathodic material.

FIG. 2A and FIG. 3 show layers of controlled porosity made up of a relatively highly porous ceramic electrolyte material region 45 surrounded by a ceramic electrolyte material exoskeleton of relatively low porosity 60. In some embodiments of the disclosure, the low porosity is less than 10% porosity, so that the relatively low porosity exoskeleton 60 forms a sealing enclosure around the relatively high porosity region 45. The relatively low porosity exoskeleton 60 of the controlled porosity layers may extend entirely around the relatively high porosity region 45, as shown in FIG. 2A. FIG. 2B shows the relatively low porosity exoskeleton 60 bonds with low porosity separator layers 30 adjacent the porous layers, completing the seal. In this configuration, the relatively high porosity region is completely encased within the relatively low porosity exoskeleton 60 and the low porosity separator 30 or the current collector 50 to either side of the high porosity layer. Alternatively, as in FIG. 3, the relatively low porosity exoskeleton region 60 of the controlled porosity layer may extend only partially around the relatively high porosity region 45 of the layer. Thus, a port 75 can be created, whereby the open volume of the relatively high porosity region 45 can be filled with a fluid material introduced from the outside, through the port 75. Fluids introduced into the cathode region would include solutions of lithium salts or slurries based on lithium bearing compounds. The open volume of the relatively high porosity region 45 of the layers with controlled porosity can vary from 20% to 100%. It should be noted 100% is an upper limit, which can correspond to a generally open space with columns or other support features for structural purposes.

Referring to FIGS. 1 and 2B, the layers of low porosity electrolyte material form separators 30, eliminating direct contact between the active anode and cathode materials contained in the porous regions 10 or 40. The porous areas 45 of the layers with controlled porosity 40 and 10 are the regions where anode and cathode active materials can be installed. The separator layers 30 can be designed to be merely thick enough to ensure no open pores exist in the separator 30 that would allow direct communication between the anode and cathode regions. For example, the separator thickness can vary in the range of 0.01 µm to 1000 µm. Depending upon the properties of the electrolyte material, a thin layer provides low internal resistance but a higher risk of penetration by lithium or lithium bearing materials, but a safer, thick layer increases the internal resistance of the sub-cell.

The anode regions 40 and cathode regions 10 can be designed to optimize the performance of the specific materials with respect to thickness and the configuration of the pores. As shown in FIG. 1, a cell 100 can include one to thousands of sub-cells 99. Each sub-cell 99 can include an anode region 40 and a cathode region 10, separated by a separator 30. Furthermore, each sub-cell 99 can include current collectors for each anode 50 and cathode region 20. The current collectors can form the boundaries of sub-cell 99. For example, each sub-cell 99 can include an anode current collector 50 positioned on the surface of the controlled porosity, anode layer 40 opposite the surface interfacing with the separator 30. Moreover, each sub-cell 99 can include a cathode current collector 20 be positioned on the surface of the controlled porosity, cathode layer 10 opposite the surface interfacing with the separator 30. In some embodiments, the current collector 20 or 50 can optionally work in conjunction with a single layer, either anode layer 40 or cathode layer 10. In alternative embodiments, the current collector 20 or 50 can serve the electronic current collection requirements for two adjacent layers of either anode layer 40 or cathode layer 10.

In one embodiment, the multilayered structure of anode regions 40, separator 30, and cathode regions 10 is assembled in its final design and chemical format without either active cathode or active anode materials present. The active anode and cathode materials are then inserted and sealed in place in the completed electrolyte structure. In this embodiment, the open volume of the porous anode regions 40 can be filled with the active anode material and the open volume of the porous cathode regions 10 can be filled with the active cathode materials. In some embodiments, filling the open volume of the porous anode regions 40 and the porous cathode regions 10 include converting the active materials to a fluid and drawing the fluid material into the porous structure under the force of a vacuum and/or pressure. The conversion of the electrode materials to a fluid can involve melting the electrode materials. The conversion of the electrode materials to a fluid can also include compounding the electrode materials into a mixture of solid and liquid materials to form a slurry. Finally, the conversion of the electrode materials to a fluid can include dissolving the electrode materials in a solvent, or converting the electrode materials to a fine powder. It should be understood that other steps or processes can be included in the process of converting the electrode materials to a fluid. The steps mentioned herein are not intended to be exhaustive.

In some embodiments, the electrode material can be fabricated as solid or semi solid structures and shaped to precisely fit the electrode spaces. The electrode material structures can be inserted into and secured in the respective electrode spaces.

To allow for the incorporation of anode and/or cathode materials using the method described above, the cell is designed such that the anode material can be easily introduced into the anode regions 40 while avoiding introduction of the anode materials into the cathode regions 10. In addition, the cathode material can be introduced into the respective porous region 10 while avoiding introduction of the cathode material into the porous structure region intended for the anode material 40. In some embodiments, this is accomplished by designing the cell such that all the anode and cathode porous structure regions are sealed. As shown in FIG. 3, the anode and cathode porous structure regions are sealed continuously along at least three quarters of the edges of the sheet by high density electrolyte 60, and open over from $\frac{1}{1,000}$ to $\frac{1}{4}$ of the total circumference of the sheet of porous structure 45 forming a port 75 for filling the pores in region 45.

The porous structure regions for an anode layer 40 can be open at a first location of the stack of cell layers, while all the open edge portions of a porous structure region for a cathode layer 10 can be open to a second location of the stack of cell layers. The first and second locations are selected such that the open portions of the anode porous structure region 40 can be immersed into a first fluid anode material while the open portions of the cathode porous structure region 10 can remain clear of the anode electrode material. In this way, the second porous structure region is not contaminated with anode electrode material. Likewise, the cathode material can be introduced to a cathode porous structure region 10, also avoiding contamination of the anode porous structure region 40 or the fluid anode active material with fluid cathode active material.

In some embodiments, one or both electrode active materials can be included in the respective electrode regions 10 and 40 during the assembly of the layered electrolyte structure. The electrode materials can be chosen to be compatible with processing of the electrolyte structure such that the electrode materials can be included with their final physical and chemical properties during assembly of the electrolyte structures 10, 30, 40. Moreover, these electrode materials can retain their desired physical and chemical properties throughout the manufacturing process of the layered structure. Alternatively, the electrode materials can be included during the assembly process as precursors that will react during the manufacturing process to exhibit the desired chemical and physical properties at the completion of the processing of the layered electrolyte structure.

In some embodiments, the anode regions 40 are created as sealed structures. As shown in FIG. 2, the sealed structures can include relatively high porosity regions fully surrounded by relatively low porosity regions. The anode spaces 45 contain no anode materials at the conclusion of manufacturing the layered electrolyte structure. Furthermore, there is no means for filling the anode regions with anode materials other than by ionic transport and reduction of anode materials within the anode region.

Figure 4:
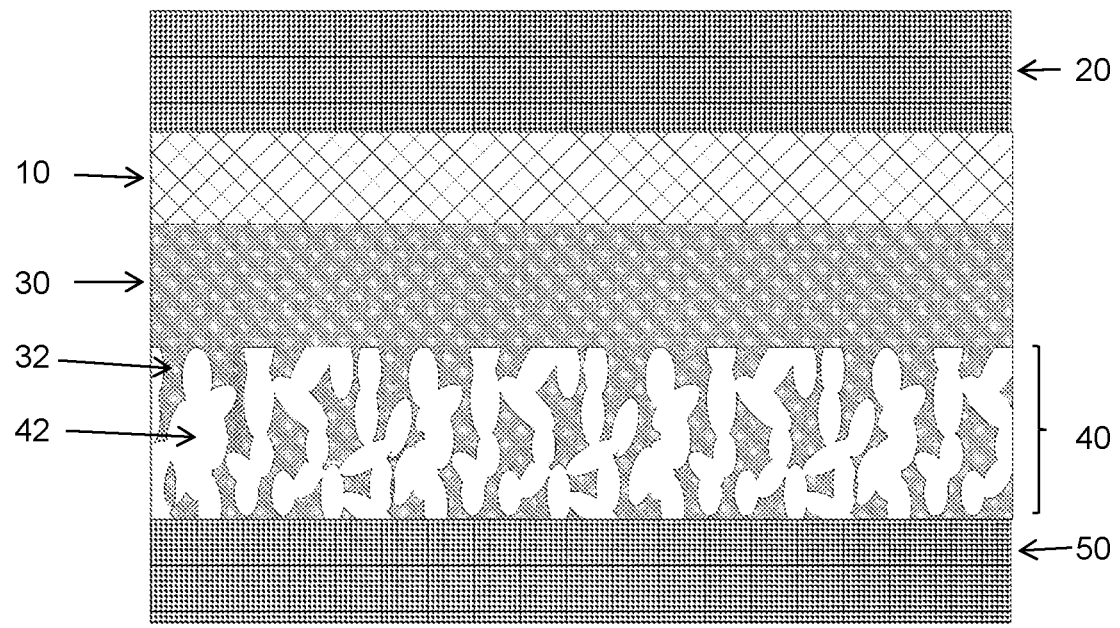
FIG. 4 is a cross section within a sub-cell with the anode region formed of porous ceramic electrolyte as manufactured.
Figure 5:
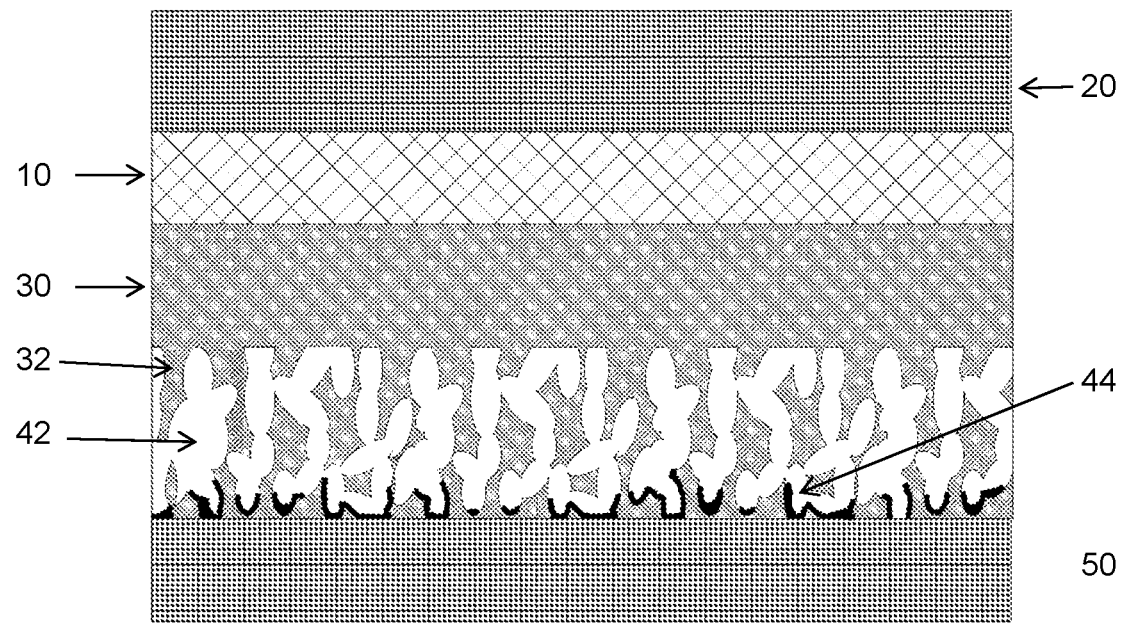
FIG. 5 is a cross section within a sub-cell with the anode region formed of porous ceramic electrolyte including some lithium plated into the pores.
Figure 6:
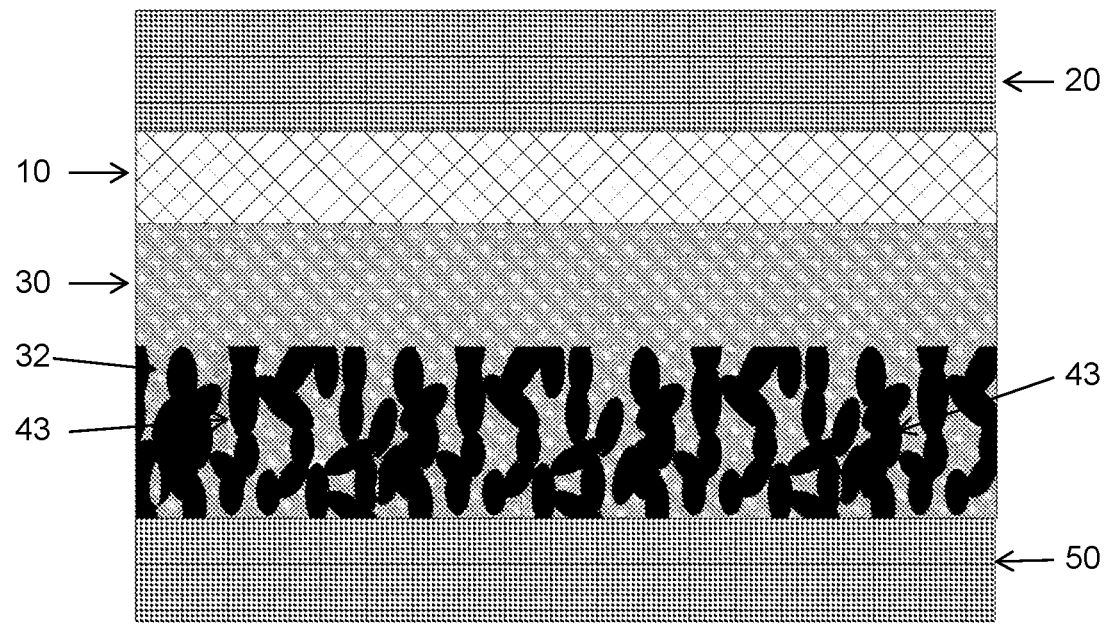
FIG. 6 is a cross within a sub-cell with the anode region formed of porous ceramic electrolyte including pores completely filled with lithium.

FIG. 4 shows a cross section of this region, where there is a solid ceramic electrolyte 32 in the anode region. The electrolyte can be full of pores 42, which are empty at the completion of the manufacturing process, as described above. The balance of the structure in FIG. 4, FIG. 5 and FIG. 6 includes a cathode current collector 20, a cathode structure 10, a ceramic electrolyte separator 30 and an anode current collector 50. In this embodiment, all the anode materials, preferably lithium, can be introduced into the sub-cell as a part of the cathode material 10, and moved to the anode region 40 during the first charge cycle. FIG. 5 shows lithium 44 partially occupying the anode pores 42. In an extreme case, illustrated in FIG. 6, charging can result in pores fully occupied with lithium 43.

In some embodiments of the present disclosure, assembly of the cell structure is accomplished by sequential deposition of layers of precursors for the desired final materials. Each deposition is patterned appropriately for the function of the individual layers or regions. The precursors can include mixtures of materials that result in the desired density, porosity and electrochemical properties after a heat treatment. The precursors can also include materials that act to bind the precursor materials in the predetermined configuration. The binding materials can be separate materials from the materials that form the desired end materials, or they can be all or part of the materials that form the desired end material and have binding properties. Where the binding materials are separate materials, added exclusively for their binding properties, the binding materials can be removed from the structure during the heat-treating process.

In some embodiments, the precursor materials are deposited in formats which are highly flexible and not brittle. In an exemplary embodiment, the format is a fluid, including sheets which are easily plastically deformed without sacrificing the integrity of the sheet. The fluids can include, for example, pastes, flowable powders and green tapes. It should be understood that other materials can be implemented, as this list is not intended to be exhaustive. Deposition of all the materials required for a cell can be accomplished with the precursors in one physical form or a combination of two or more physical forms. After all the layers of the cell structure are deposited together, the completed structure can be heat treated to modify the precursors to have the desired final physical and electrochemical properties. For example, the completed structure can be heat treated to modify the mechanical strength, high and controlled porosity of cathode regions 10 and anode regions 40, low or no porosity for the separator layers 30 and exoskeleton regions 60. The completed structure can be heat treated to modify the ionic conductivity for all electrolyte materials, and the electronic conductivity for the current collectors 20 and 50. Finally, the completed structure can be heat treated to modify other properties that can be required for the electrical, mechanical and environmental requirements of the completed cell 100.

In some embodiments, the precursors are deposited using additive manufacturing techniques. For example, the precursors can be deposited implementing a 3D printer capable of depositing multiple materials under the direct control of a computer system. The 3D printer can be guided by CAD data for each layer of the structure. In an exemplary embodiment of the present disclosure, the precursors are deposited as layers of green (unfired) tape, prepared to the desired patterns, stacked in the design order and laminated together. In some embodiments of the present disclosure, both the 3D printing and laminated tape deposition methods can be combined to form the completed structure.

While various embodiments have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A ceramic lithium battery sub-cell comprising:
a cathode layer;
an anode layer positioned beneath the cathode layer;
a separator positioned between the cathode layer and the anode layer, wherein the separator is a ceramic electrolyte free of penetrating apertures; and
a cathode current collector positioned on a surface of the cathode layer, and an anode current collector positioned on a surface of the anode layer;
wherein the anode layer comprises a first region and a second region, wherein the first region is filled with a first porous electrolyte encapsulated by the separator, the anode current collector and the second region at its periphery, and wherein the second region comprises a second porous electrolyte, and
wherein the porosity of the second porous electrolyte is less than the porosity of the first porous electrolyte.

2. The ceramic battery sub-cell of claim 1, wherein the first porous electrolyte comprises a porous ceramic electrolyte comprising an open volume between 20% and 100%.

3. The ceramic battery sub-cell of claim 1, wherein the anode region comprises pores filled with metallic lithium by electrolytic transport of lithium ions from lithium bearing cathode material within the cathode region.

4. The ceramic battery sub-cell of claim 1, wherein the anode region comprises pores partially filled with metallic lithium by electrolytic transport of lithium ions from lithium bearing cathode material within the cathode region.

5. The ceramic battery sub-cell of claim 4, wherein the transport of lithium from the cathode region to the anode region charges the battery sub-cell.

6. The ceramic battery sub-cell of claim 1, wherein a periphery of the anode region is sealed by a region of the same solid electrolyte material used in the separator.

7. The ceramic battery sub-cell of claim 1, wherein the second porous electrolyte comprises a porous ceramic electrolyte comprising an open volume between 0 and 20%.

8. The ceramic battery sub-cell of claim 1, wherein the separator comprises a thickness of 0.01 μm to 1000 μm.

9. A battery comprising:
a plurality of ceramic sub-cells, wherein each of the plurality of ceramic sub cells comprises:
a cathode layer;
an anode layer positioned beneath the cathode layer; and
a separator positioned between the cathode layer and the anode layer, wherein the separator is a ceramic electrolyte free of penetrating apertures, a cathode current collector positioned on a surface of the cathode layer, and an anode current collector positioned on a surface of the anode layer;
wherein the anode layer comprises a first region and a second region, wherein the first region is filled with a first porous electrolyte encapsulated by the separator, the anode current collector and at its periphery by the second region, wherein the second region comprises a second porous electrolyte, and
wherein the porosity of the second porous electrolyte is less than the porosity of the first porous electrolyte.

10. The battery of claim 9, wherein each of the plurality of ceramic sub cells are stacked such that anode regions of adjacent cells share an anode current collector.

11. The battery of claim 9, wherein each of the plurality of ceramic sub cells are stacked in such a way that cathode regions of adjacent cells share a cathode current collector.

12. The battery of claim 9, wherein one or more of the plurality of ceramic sub cells are manufactured using one or more steps of 3D printing, wherein a ceramic material or ceramic material precursor is selectively deposited with finite thickness in a pattern defining the battery sub-cell shape.

13. The battery of claim 9, wherein one or more of the plurality of ceramic sub cells are manufactured using one or more layers of patterned green tape bearing ceramic precursors.

14. The battery of claim 9, wherein one or more of the plurality of ceramic sub cells are manufactured using one or more heat treatments to effect the final ceramic properties, including porosity, mechanical strength, ionic conductivity, and electronic conductivity.

15. The battery of claim 9, wherein the first porous electrolyte comprises a porous ceramic electrolyte comprising an open volume between 20% and 100%.

16. The battery of claim 9, wherein the second porous electrolyte comprises a porous ceramic electrolyte comprising an open volume between 0 and 20%.

17. The battery of claim 9, wherein the separator comprises a thickness of 0.01 μm to 1000 μm.

* * * * *